United States Patent [19]

Makishima, deceased et al.

[11] Patent Number: 4,801,654

[45] Date of Patent: Jan. 31, 1989

[54] BLOCK COPOLYMER CONTAINING BLOCK FROM TETRAHYDROFURAN

[75] Inventors: Tokuo Makishima, deceased, late of Saitama; by Nobuko Makishima, legal representative, Tokyo; Satoshi Ueki, Saitama; Chihiro Imai, Kanagawa, all of Japan

[73] Assignee: Toa Nenryo Kogyo K.K., Tokyo, Japan

[21] Appl. No.: 61,091

[22] Filed: Jun. 12, 1987

Related U.S. Application Data

[62] Division of Ser. No. 738,068, May 24, 1985, Pat. No. 4,705,830.

[30] Foreign Application Priority Data

May 29, 1984 [JP] Japan ................................ 59-107616

[51] Int. Cl.$^4$ ...................... C08F 293/00; C08F 4/68
[52] U.S. Cl. .................................. 525/333.7; 525/186; 525/385
[58] Field of Search ............................. 525/333.7, 385

[56] References Cited

U.S. PATENT DOCUMENTS

3,497,573  2/1970  Hostetler .............................. 525/385
3,523,144  8/1970  Zimmerman et al. ............... 525/186

FOREIGN PATENT DOCUMENTS

0196317  11/1984  Japan ................................... 525/385

OTHER PUBLICATIONS

Yoshiharu, Doi, Satoshi Ueki, and Tominaga Keii, "Preparation of Living Polypropylenes by a Soluble Vanadium-Based Ziegler Catalyst," *Makromol. Chem.*, 180, pp. 1359-1361 (1979).

Yoshiharu Doi, Satoshi Ueki, and Tominaga Keii, "Living Coordination Polymerization of Propene Initiated by the Soluble V(acac)$_3$-Al(C$_2$H$_5$)$_2$CL System," *Macromolecules*, 12, pp. 814-819 (1979).

Adv. Polym. Sci., 51, 101 (1983), Control of Molecular-Weight Distribution in Polyolefins Synthesized with Ziegler-Natta Catalytic Systems, Umberto Zucchini and Giuliano Cecchin.

*Primary Examiner*—Wilbert J. Briggs, Sr.
*Attorney, Agent, or Firm*—S. H. Markowitz; J. B. Murray, Jr.; W. G. Muller

[57] ABSTRACT

A block copolymer is disclosed which includes an ethylene-propylene copolymer segment (A) and a tetrahydrofuran segment (B). The weight ratio of (A) to (B) is 5/95 to 95/5, and the block copolymer has a number-average molecular weight of about 1,000 to about 1,000,000.

11 Claims, 2 Drawing Sheets

MOLECULAR WEIGHT ($\bar{M}n$)

BLOCK COPOLYMER CONTAINING BLOCK FROM TETRAHYDROFURAN

This is a division of application Ser. No. 738,068 filed May 24, 1985, now U.S. Pat. No. 4,705,830.

BACKGROUND OF THE INVENTION

The present invention relates to a new block copolymer.

The living polymerization is useful for the production of monodisperse polymers and block copolymers of uniform composition, and many attempts have been made for the production of olefin block copolymers by living polymerization also in the area of coordinate polymerization that employs a Ziegler-Natta catalyst. However, it is difficult to produce block copolymers of uniform composition by living polymerization because chain transfer reactions and termination reactions take place frequently during living polymerization.

The present inventors found that a catalyst composed of V(acetylacetonate)$_3$ and Al(C$_2$H$_5$)$_2$Cl provides nearly monodisperse living polypropylene. [Makromol. Chem., 180, 1359 (1979); and Makromolecules., 12, 814 (1979)] The present inventors also found that this technology can be applied to the living copolymerization of ethylene and propylene. According to this technology, it is possible to produce a nearly monodisperse random living copolymer of ethylene and propylene. This copolymer is reacted with a halogen to convert it into a copolymer having halogenated terminals. The copolymer is then reacted with a terminal converting agent to form the terminal carbocation of the copolymer. Finally, tetrahydrofuran is polymerized in the presence of the cation. Thus there is obtained a block copolymer of uniform composition which is composed of the segments of nearly monodisperse ethylene-propylene random copolymer and the segments of nearly monodisperse polymer formed by ring opening polymerization of tetrahydrofuran. The present invention was completed based on this finding.

The gist of this invention resides in a block copolymer having a number-average molecular weight of about 1,000 to about 1,000,000 in which the random copolymer segment (A) is bonded to the polymer segment (B), with the ratio of (A) to (B) being 5/95 to 95/5 by weight, said random copolymer segment (A) being composed of the constitutional units represented by the formulas I and II below,

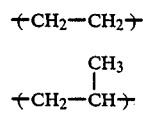

[the amount of I being 30 to 80 wt% and the amount of II being 70 to 20 wt%], and said polymer segment (B) being composed of the constitutional units represented by the formula $+O.(CH_2)_4+$. Said copolymer is produced by the steps of performing living polymerization of ethylene and propylene in the presence of β-diketone vanadium chelate and an organoaluminum compound to give a living ethylene-propylene random copolymer, reacting the random copolymer with a halogen to give an ethylene-propylene random copolymer having halogenated terminals, reacting the random copolymer with a terminal converting agent to give terminal carbocations of ethylene-propylene random copolymer, and finally polymerizing tetrahydrofuran in the presence of the terminal carbocations.

The living ethylene-propylene random copolymer is produced by copolymerizing ethylene and propylene in the presence of a polymerization catalyst composed of β-diketone vanadium chelate (referred to as vanadium compound hereinafter) and an organoaluminum compound.

The vanadium compound is represented by the formula below.

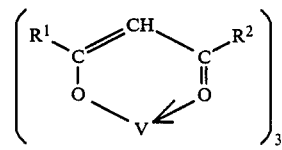

(where R$^1$ and R$^2$ are the same or different alkyl groups or aryl groups.) It includes, for example, V(acetylacetonate)$_3$, V(benzoylacetylacetonate)$_3$, and V(dibenzoylmethanate)$_3$.

The organoaluminum compound is represented by the formula R$_2$AlX (where R is an alkyl group or aryl group having 1 to 8 carbon atoms, and X is a halogen atom). It includes, for example, dimethylaluminum chloride, diethylaluminum chloride, diethylaluminum bromide, and diisobutylaluminum chloride.

The polymerization reaction should preferably be performed in a solvent which is inert and liquid at the time of polymerization. Examples of the solvent include saturated aliphatic hydrocarbons such as propane, butane, pentane, hexane, and heptane; saturated alicyclic hydrocarbons such as cyclopropane and cyclohexane; and aromatic hydrocarbons such as benzene, toluene, and xylene.

Ethylene and propylene can be brought into contact with the polymerization catalyst in any manner. Preferably, the contact is accomplished by adding a solution of the organo-aluminum compound and then a solution of the vanadium compound to a solvent solution of ethylene and propylene.

The amounts of the polymerization catalyst used for 1 mol of ethylene and propylene are as follows: The amount of the vanadium compound is $1 \times 10^{-4}$ to 0.01 mol, preferably $5 \times 10^{-4}$ to $5 \times 10^{-3}$ mol, and the amount of the organoaluminum compound is $1 \times 10^{-3}$ to 0.1 mol, preferably $5 \times 10^{-3}$ to 0.01 mol. Preferably, the organoaluminum compound is used in an amount of 5 to 25 mol for 1 mol of the vanadium compound.

The molecular weight and yields of the living copolymer can be regulated by changing the reaction temperature and reaction time. According to this invention, it is possible to produce a polymer which has a molecular weight distribution similar to that of a monodisperse polymer, if the polymerization temperature is kept low, particularly lower than −50° C. Polymerization at −65° C. or below provides a living ethylene-propylene random copolymer having a molecular weight distribution of 1.05 to 1.40 which is defined by $\overline{Mw}/\overline{Mn}$ (where $\overline{Mw}$ is the weight-average molecular weight and $\overline{Mn}$ is the number-average molecular weight.

The polymerization reaction may be accompanied by a reaction accelerator such as anisole, water, oxygen, alcohol (methanol, ethanol, isopropanol, etc.), and ester (ethyl benzoate, ethyl acetate, etc.). The reaction accelerator is used in an amount of 0.1 to 2 mol for 1 mol of the vanadium compound.

The ratio of ethylene to propylene in the living copolymer should be in such a range that the property of the final block copolymer attributable to the ethylene-propylene random copolymer in it is not adversely affected. The ethylene-to-propylene ratio is usually 30/70 to 80/20 by weight.

The composition of the ethylene-propylene random copolymer can be regulated by changing the ratio of ethylene to propylene at the time of living copolymerization. The greater the amount of ethylene used, the broader the molecular weight distribution of the resulting polymer, and this is not preferable. A living copolymer of high ethylene content having a narrow molecular weight distribution (or a nearly monodisperse living copolymer) can be produced by performing living polymerization of a small amount of propylene prior to the living copolymerization of ethylene and propylene. The living copolymer obtained in this way has a narrow molecular weight distribution and yet contains a large amount of ethylene. In actual, propylene alone is supplied at first to the polymerization system so that living polypropylene having a number-average molecular weight of 500 to 2000 is formed. Subsequently, ethylene is supplied to continue living polymerization in the presence of a large amount of unreacted propylene monomer until the random copolymerization of ethylene and propylene is completed.

In the way mentioned above, it is possible to produce a nearly monodisperse living ethylene-propylene random copolymer having a number-average molecular weight of about 500 to about 500,000 (in terms of propylene, to be repeated hereinafter).

In the next step, the random copolymer is brought into contact with a halogen so that the polymerization of ethylene and propylene is suspended immediately. The resulting product is an end-halogenated ethylene-propylene random copolymer having the skeleton of the above-mentioned living copolymer.

The halogen that can be used in that step is iodine, chlorine, or bromine, and it is used in an amount of 2 mol and up, preferably 2 to 5 mol, for 1 mol of the organoaluminum compound used. The halogen may be used as such; but it should preferably be used in the form of solution in the same solvent as used for the above-mentioned living copolymerization. The concentration of the solution is 0.1 to 5 mol in 1 liter of the solvent. Usually, halogenation is performed for 5 minutes to 6 hours at $-50°$ to $-100°$ C.

Upon addition of an alcohol to the reaction system, the halogenated ethylene-propylene random copolymer separates out.

The halogenated ethylene-propylene random copolymer thus obtained is then reacted with a terminal converting agent represented by the formula MY (where M denotes Ag, Na, Li, K, Rb, or Cs; and Y denotes $ClO_4$, $BF_4$, $PF_6$, $AsF_6$, or $SbF_6$). Examples of this agent include $AgClO_4$, $AgBF_4$, $KClO_4$, $LiClO_4$, $AgSbF_6$, $AgPF_6$, $AgAsF_6$, $NaSbF_6$, $KSbF_6$, $LiSbF_6$, $NaPF_6$, $KPF_6$, $LiPF_6$, $NaAsF_6$, $KAsF_6$, $LiAsF_6$, $NaBF_4$, $KBF_4$, and $LiBF_4$.

The terminal converting agent is used in an amount of 1 mol or up, preferably 1.5 to 30 mol, for 1 mol of the halogenated ethylene-propylene random copolymer. The reaction between the halogenated copolymer and the terminal converting agent is usually performed in a solvent. The same solvent as used for the above-mentioned living polymerization can be used for this purpose, and tetrahydrofuran may also be used as well.

The above-mentioned reaction forms the terminal carbocation of ethylene-propylene random copolymer. This cation serves as an initiator for the polymerization of tetrahydrofuran (abbreviated as THF hereinafter). As the result of the polymerization of THF, there is obtained the block copolymer of this invention.

The terminal conversion reaction of the halogenated ethylene-propylene random copolymer and the subsequent polymerization of THF are performed at $-80°$ C. to $+50°$ C., preferably $-20°$ C. to $+20°$ C., for 3 hours or longer, preferably 5 hours or longer. The polymer segment (B) formed by the ring opening polymerization of THF increases in molecular weight as the polymerization temperature for THF is raised or the polymerization time for THF is extended.

THF is used in an amount of 10 times (by weight), preferably 20 times, the amount of the halogenated copolymer.

The polymerization reaction of THF can be suspended by adding an alcohol such as methanol and ethanol to the polymerization system. After polymerization, excess THF is removed and the precipitated solids are washed with acetone, methanol, or the like and dried. In this way, the block copolymer is recovered.

Thus there is obtained an AB-type block copolymer in which the copolymer segment (A) formed by random copolymerization of ethylene and propylene is connected to the polymer segment (B) formed by ring opening polymerization of THF. This copolymer has a number-average molecular weight of about 1,000 to about 1,000,000, preferably 3,000 to 300,000, more preferably 5,000 to 200,000. The ratio of segment (A) to segment (B) in the copolymer is 5/95 to 95/5 (by weight).

The molecular weight and composition of the block copolymer can be regulated by changing the molecular weight and composition of the living ethylene-propylene random copolymer and the conditions for polymerization of THF.

The block copolymer of this invention is characterized by that it is a nearly monodisperse polymer of uniform composition having a molecular weight distribution ($\overline{Mw}/\overline{Mn}$) of 1.05 to 1.40.

The block copolymer of this invention is composed of nonpolar polymer segments (A) and polar polymer segments (B). Therefore, it differs in properties from the conventional block copolymers and polymer mixtures. It is useful as a dyeing agent, adhesive, polymer modifier, compatibilizing agent, and surface modifier.

This invention is now described in more detail with reference to the following examples, in which the characterization of polymers and copolymers was carried out in the following way.

Molecular weight and molecular weight distribution: Determined by using GPC (gel permeation chromatography), Model 150, made by Waters Co. under the following conditions.
 Solvent: trichlorobenzene
 Temperature: 135° C.

Flow rate of solvent: 1.0 ml/min
Sample concentration: 0.15 wt/vol%
Column: GMH6 made by Toyo Soda Kogyo Co.
The calibration curve of polypropylene for determination was prepared according to the universal method from the calibration curve of polystyrene obtained by using the standard sample of monodisperse polystyrene available from Waters Co.

Determination of polymer structure ($^{13}$C-NMR spectrum): Performed by using Model XL-200 made by Varian Co., equipped with the PFT pulse Fourier transformer.
Frequency: 50 MHz
Temperature: 120° C.
Pulse width: 8.2 $\mu s \pi/3$
Pulse interval: 4 sec
Number of integration: 5000
Sample: prepared by dissolving in a 2:1 mixture solvent of trichlorobenzene and heavy benzene

EXAMPLE 1

Synthesis of Living Ethylene-Propylene Random Copolymer

Into a 200-ml flask, with the atmosphere therein completely replaced with nitrogen, was placed toluene as a solvent, and the system was cooled to −78° C. While keeping that temperature, 35 g (0.83 mol) of propylene was added. (It became liquefied and dissolved.) Then there were added a toluene solution containing 5 mmol of Al(C$_2$H$_5$)$_2$Cl, a toluene solution containing 0.5 mmol of V(acetylacetonate)$_3$, and 0.25 mmol of anisole in the order mentioned. Preliminary polymerization was started at −78° C. One hour after preliminary polymerization, nitrogen was evacuated and 1.3 g (4.6 mmol) of ethylene was introduced. Copolymerization of ethylene and propylene was carried out at −78° C. for 15 minutes under an atmosphere of nitrogen. Thus there was obtained a living ethylene-propylene random copolymer. (Ethylene-propylene random copolymer is abbreviated as EPR hereinafter.)

Synthesis of Iodized EPR

To the above-mentioned polymerization system was added 22 ml of toluene solution containing 0.5 mol/liter of iodine, and the reaction was carried out at −78° C. Thirty minutes later, the reaction solution was introduced into 500 ml of ethanol which had previously been cooled to −78° C., to cause the polymer to separate out. The resulting polymer was washed five times with 500 ml of ethanol and then dried. Thus there was obtained end-iodized EPR.

Figure 1:
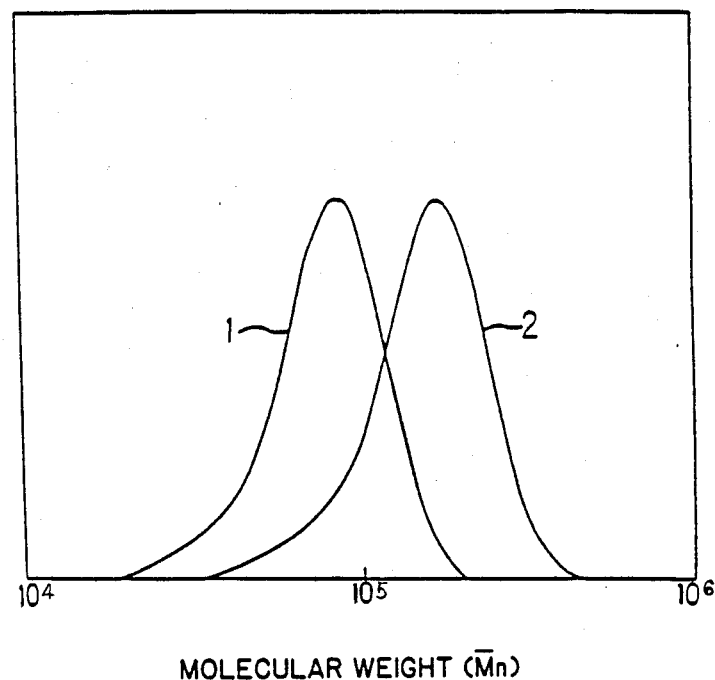
FIG. 1 shows the GPC elution curves of the polymer and copolymer of this invention.
Figure 2:
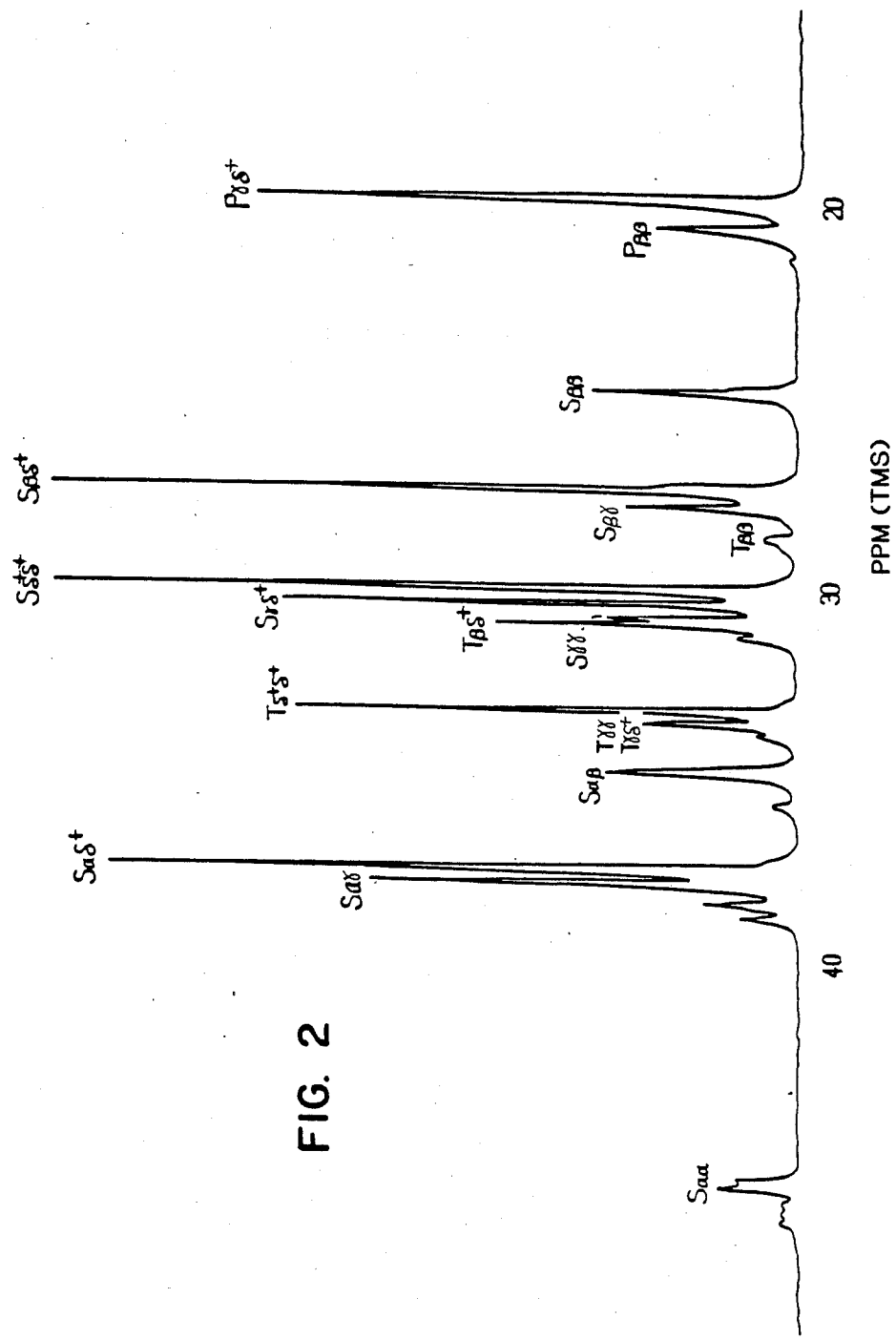
FIG. 2 shows the NMR spectrum of the polymer of this invention.

The iodized EPR was examined for molecular weight and molecular weight distribution. It was found to be a nearly monodisperse polymer having Mn=85,000 and $\overline{Mw}/\overline{Mn}$=1.22. This polymer gave a GPC elution curve as shown in FIG. 1 (1). The single peak should be noted. The polymer also gave the $^{13}$C-NMR chart as shown in FIG. 2. The content of propylene in this polymer was calculated according to the following equation from the area of the peak (indicated by S) assignable to the secondary carbon atom and the area of the peak (indicated by T) assignable to the tertiary carbon atom.

$$\text{Propylene content (mol \%)} = \frac{T}{\frac{1}{2}(S+T)} \times 100$$

The polymer was found to contain 42 mol% (equivalent to 50 wt%) of propylene. (Incidentally, the peak indicated by P is assignable to the primary carbon atom.)

According to thermal analysis by a differential scanning calorimeter (DSC), EPR was found to have no glass transition point (about −10° C.) assignable to proylene homopolymer.

Synthesis of EPR Block Copolymer

In 20 ml of THF was dissolved 0.92 g of the iodized EPR obtained as mentioned above. The solution was placed in a 100 ml flask, and then a slurry composed of 0.1 g (0.82 mmol) of NaClO$_4$ and 30 ml of THF was added at 0° C., whereby the polymerization reaction of THF was started.

After stirring for 430 hours, 10 ml of methanol was added to suspend the polymerization reaction of THF. The solid phase (NaCl) was removed and then the polymer was separated from unreacted THF. The polymer was washed five times with 200 ml of acetone, followed by drying. Thus there was obtained 1.1 g of copolymer.

The resulting copolymer gave a GPC elution curve having a single peak as shown in FIG. 1 (2). It should be noted that the peak is shifted toward the high molecular weight as compared with that of the iodized EPR. This copolymer was found to have a number-average molecular weight of 109,000 and a molecular weight distribution ($\overline{Mw}/\overline{Mn}$) of 1.7, which is close to that of a monodisperse polymer.

The analysis of the copolymer by $^{13}$C-NMR gave, in addition to the peaks assignable to the iodized EPR, the peaks assignable to methylene carbons in polytetramethyleneoxide [$+O-\overset{*}{C}H_2-CH_2-CH_2-\overset{*}{C}H_2+_n$; 67.7 ppm and $+O-CH_2-CH_2-CH_2-CH_2+_n$; 26.0 ppm]. This result indicates that the copolymer is an AB-type block copolymer composed of the segment (A) which is an ethylenepropylene random copolymer and the segment (B) which is a polymer formed by ring opening polymerization of THF. The ratio of segment (A) to segment (B) in the copolymer was 84/16 (by weight), which was calculated from the yield of the copolymer.

EXAMPLES 2 TO 4

Synthesis of Iodized EPR

Three kinds of living EPRs were prepared as in Example 1 under different polymerization conditions. The resulting living EPRs were iodized in the same way as in Example 1 to give iodized EPRs, the properties of which are shown in Table 1.

Synthesis of EPR Block Copolymer

The iodized EPR obtained in the above step was used for polymerization of THF in the same way as in Example 1 except the amount, the terminal converting agent, and the polymerization condition were changed as shown in Table 1. There were obtained AB-type EPR block copolymers having the properties as shown in Table 1.

TABLE 1

|  | Example 1 | Example 2 | Example 3 | Example 4 |
|---|---|---|---|---|
| Iodized EPR |  |  |  |  |
| $\overline{Mn}$ ($\times 10^4$) | 8.5 | 2.1 | 0.75 | 5.8 |
| $\overline{Mw}/\overline{Mn}$ | 1.22 | 1.25 | 1.21 | 1.32 |
| Propylene content (wt %) | 50 | 50 | 70 | 30 |
| Amount used (g) | 0.92 | 0.60 | 1.05 | 16.2 |

TABLE 1-continued

| | Example 1 | Example 2 | Example 3 | Example 4 |
|---|---|---|---|---|
| Terminal converting agent | NaClO$_4$ | NaClO$_4$ | AgClO$_4$ | AgAsF$_6$ |
| THF polymerization | | | | |
| Temp. (°C.) | 0 | 0 | 0 | −20 |
| Time (h) | 430 | 430 | 430 | 168 |
| EPR block copolymer | | | | |
| Yield (g) | 1.10 | 0.94 | 2.82 | 17.2 |
| $\overline{M}_n$ (×10$^4$) | 10.9 | 4.4 | 3.2 | 6.2 |
| $\overline{M}_w/\overline{M}_n$ | 1.17 | 1.21 | 1.19 | 1.35 |
| A/B (wt %) | 84/16 | 64/36 | 37/63 | 94/6 |

What is claimed is:

1. A block copolymer having a number-average molecular weight of about 1,000 to about 300,000 and a molecular weight distribution of 1.05 to 1.40 in which a random copolymer segment (A) is bonded to a polymer segment (B), with the ratio of (A) to (B) being 5/95 to 95/5 by weight, said random copolymer segment (A) being composed of the constitutional units represented by the formulas I and II below:

$$+CH_2-CH_2+ \quad \text{I.}$$

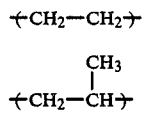   II.

wherein the amount of I in said segment (A) is from 30 to 80 wt% and the amount of II in said segment (A) is from 70 to 20 wt%, and said polymer segment (B) being composed of the constitutional units represented by the formula [O—(CH$_2$)$_4$], said block copolymer formed by a process which comprises the steps of:

(a) performing living polymerization of ethylene and propylene in a polymerization zone at a temperature of less than −50° C. in the presence of a catalyst comprising a beta-diketone vanadium chelate and an organoaluminum compound, to provide a living ethylene-propylene random copolymer;

(b) reacting said ethylene-propylene copolymer with a halogen to provide an ethylene-propylene random copolymer having halogenated terminal groups;

(c) reacting said halogenated copolymer produced in step (b) with a terminal converting agent to provide terminal carbocations of ethylene-propylene random copolymer; and (d) polymerizing the product of step (c) with tetrahydrofuran to form said block copolymer.

2. The block copolymer of claim 1 wherein said catalyst used in step (a) is formed by introducing to said polymerization zone (i) a beta-diketone vanadium chelate of the formula:

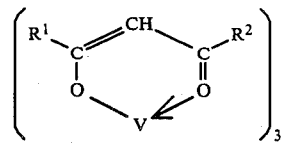

wherein R$_1$ and R$_2$ are the same or different and are each alkyl or aryl, and (ii) an organoaluminum compound of the formula R$_2$AlX, wherein R is an alkyl group of 1 to 8 carbon atoms and X is a halogen atom.

3. The block copolymer of claim 2 wherein said vanadium chelate comprises a member selected from the group consisting of V(acetylacetonate)$_3$, V(benzoylacetylacetonate)$_3$, and V(dibenzoylmethanate)$_3$.

4. The block copolymer of claim 2 wherein said organoaluminum compound comprises a member selected from the group consisting of dimethylaluminum chloride, diethylaluminum chloride, diethylaluminum bromide, and diisobutylaluminum chloride.

5. The block copolymer according to claim 1 wherein said vanadium chelate is used in an amount of from $1\times10^{-4}$ to 0.01 mol per 1 mol of said ethylene and propylene and wherein said organoaluminum compound is used in an amount of from about $1\times10^{-3}$ to 0.1 mol per 1 mol of said ethylene and propylene.

6. The block copolymer according to claim 5 wherein said step (a) polymerization temperature is −65° C. or below.

7. The block copolymer according to claim 6 wherein said organoaluminum compound is used in an amount of from 5 to 25 mol per 1 mol of said vanadium chelate.

8. The block copolymer according to claim 1 wherein from 2 to 5 moles of said halogen are employed in step (b) per mole of said organoaluminum compound.

9. The block copolymer according to claim 1 wherein said terminal converting agent comprises a compound of the formula MY, wherein M is Ag, Li, Na, K, Rb or Cs, and Y is ClO$_4$, BF$_4$, PF$_6$, AsF$_6$ or SbF$_6$.

10. The block copolymer of claim 1 wherein said terminal converting agent is employed in an amount of from 1.5 to 30 moles, per 1 mol of said halogenated copolymer.

11. The block copolymer according to claim 1 wherein said polymerization step (d) is performed at a temperature of from −80° to +50° C.

* * * * *